United States Patent
Michihata et al.

[11] Patent Number: 5,635,294
[45] Date of Patent: *Jun. 3, 1997

[54] DISK TYPE MAGNETIC RECORDING MEDIUM AND PROCESS OF MANUFACTURING THE SAME

[75] Inventors: Isamu Michihata; Hideki Murata; Katsuyuki Takeda; Nobuyuki Sekiguchi; Syozo Kikugawa, all of Hino, Japan

[73] Assignee: Konica Corporation, Japan

[*] Notice: The portion of the term of this patent subsequent to Aug. 10, 2011, has been disclaimed.

[21] Appl. No.: 59,884

[22] Filed: May 10, 1993

Related U.S. Application Data

[63] Continuation of Ser. No. 634,057, Dec. 26, 1990, abandoned.

[30] Foreign Application Priority Data

Dec. 28, 1989 [JP] Japan ................. 1-339746
Dec. 28, 1989 [JP] Japan ................. 1-339747
Dec. 28, 1989 [JP] Japan ................. 1-339748

[51] Int. Cl.$^6$ ............ G11B 5/66; B32B 5/16; B05D 5/12
[52] U.S. Cl. .......... 428/323; 428/327; 428/328; 428/329; 428/330; 428/694 B; 428/694 BU; 428/694 BN; 428/900; 427/128; 427/129; 427/130; 427/131

[58] Field of Search ................. 428/329, 900, 428/694 B, 694 BU, 323, 327, 328, 330; 427/128, 129, 130, 131

[56] References Cited

U.S. PATENT DOCUMENTS

| | | | |
|---|---|---|---|
| 4,729,922 | 3/1988 | Ejiri et al. | 428/328 |
| 4,801,505 | 1/1989 | Ejiri et al. | 428/404 |
| 4,812,330 | 3/1989 | Ishikuro et al. | 427/128 |
| 4,818,606 | 4/1989 | Koyama et al. | 428/323 |
| 4,820,581 | 4/1989 | Saito et al. | 428/323 |
| 4,835,049 | 5/1989 | Ishiguro et al. | 428/323 |
| 4,847,156 | 7/1989 | Nishikawa et al. | 428/425.9 |

*Primary Examiner*—Leszek Kiliman
*Attorney, Agent, or Firm*—Jordan B. Bierman; Bierman, Muserlian and Lucas LLP

[57] ABSTRACT

A magnetic recording medium and a manufacturing process thereof are disclosed. The medium comprises a magnetic layer containing a binder, chromium oxide having an average particle size within the range of 0.3 to 0.5 μm and a metal magnetic powder, wherein the binder comprises a polyurethane resin having a polar group selected from the group consisting of —SO$_3$M, —OSO$_3$M, —COOM, —PO(OM), and —OPO(OM)$_2$ wherein M represents a hydrogen atom or an alkali metal.

10 Claims, 1 Drawing Sheet

DISK TYPE MAGNETIC RECORDING MEDIUM AND PROCESS OF MANUFACTURING THE SAME

This application is a continuation of application Ser. No. 07/634,057, filed Dec. 26, 1990, now abandoned.

FIELD OF THE INVENTION

The present invention relates to a disk type magnetic recording medium.

BACKGROUND OF THE INVENTION

As disk type magnetic recording mediums used for still video, computers, etc., magnetic recording mediums have been hitherto used in which a magnetic layer comprising ferromagnetic alloy powder dispersed in a binder is coated on a non-magnetic support. As the magnetic recording mediums of such types are made higher in density and higher in S/N ratio, it has been recently attempted to make finer the particles of magnetic materials. As the particles are made finer, however, the abrasive properties of magnetic materials are lowered to bring about problems of head clogging and a lowering of durability. In addition, the ferromagnetic alloy powder has originally not so good dispersibility in a binder, and hence in actual circumstances it is difficult to obtain electromagnetic conversion characteristics as expected.

As a countermeasure to prevent the lowering of durability, the head clogging, etc. as stated above, it has been hitherto proposed to add an abrasive such as $Al_2O_3$, SiC or $Cr_2O_3$ in a magnetic layer. If, however, such an abrasive is added in a large quantity, a magnetic recording medium involves a deterioration of the degree of packing of magnetic powder or a deterioration of the dispersibility thereof, bringing about the problem of a lowering of electromagnetic conversion characteristics because of the deterioration of surface properties.

If the abrasive is added in a smaller amount so that the surface properties can be improved, the electromagnetic conversion characteristics can be improved but no sufficient abrasive properties can be obtained, making it impossible to satisfactorily prevent the lowering of durability, the head clogging, etc.

On the other hand, $Cr_2O_3$ particles originally take a time for their dispersion. When a magnetic coating composition is prepared taking account of the dispersion thereof, they not only can be dispersed with a poor efficiency but also may cause a break of crystals of magnetic powder, so that there is a possibility of the deterioration of magnetic characteristics. Moreover, if $Cr_2O_3$ particles are added as they are, the surface of a magnetic layer may become rough because of their poor dispersion or the $Cr_2O_3$ particles themselves may fall off to cause dropouts or the like.

SUMMARY OF THE INVENTION

An object of the present invention is to provide a disk type magnetic recording medium having achieved an improvement in durability, a decrease in head clogging and a decrease in D/O (dropouts), and having high electromagnetic conversion characteristics, and a method of producing such a recording medium.

The above object of the present invention can be achieved by a disk type magnetic recording medium comprising a magnetic layer containing a binder, chromium oxide having an average particle size within the range of 0.3 to 0.5 µm and a metal magnetic powder, wherein the magnetic layer contains a first binder comprising a polyurethane resin having a polar group selected from the group consisting of $—SO_3M$, $—OSO_3M$, $—COOM$, $—PO(OM)$ and $—OPO(OM)_2$ wherein M represents a hydrogen atom or an alkali metal.

The above object of the present invention can also be achieved by a magnetic recording medium comprising a magnetic layer containing a binder, chromium oxide having an average particle size within the range of 0.3 to 0.5 µm and a metal magnetic powder, wherein the magnetic layer contains a metal magnetic powder, wherein the magnetic layer contains a metal magnetic powder comprising iron and aluminum, and the binder comprising a polyurethane resin having a polar group selected from the group consisting of $—SO_3M$, $—OSO_3M$, $—COOM$, $—PO(OM)$ and $—OPO(OM)_2$ wherein M represents a hydrogen atom or an alkali metal.

The above object of the present invention can still also be achieved by a magnetic recording medium comprising a magnetic layer containing a binder, chromium oxide having an average particle size within the range of 0.3 to 0.5 µm and a metal magnetic powder, wherein the magnetic layer contains a metal magnetic powder comprising iron and aluminum, and the binder comprising a polyurethane resin having a polar group selected from the group consisting of $—SO_3M$, $—OSO_3M$, $—COOM$, $—PO(OM)$ and $—OPO(OM)_2$ wherein M represents a hydrogen atom or an alkali metal, and said chromium oxide is dispersed in a different bender from the binder.

The present invention also provides a process for manufacturing a magnetic recording medium comprising a support and a magnetic layer containing a first binder, a second binder, chromium oxide having an average particle size within the range of 0.3 to 0.5 µm and a metal magnetic powder provided on the support, comprising the steps of;

(a) dispersing the metal magnetic powder in the first binder comprising a polyurethane resin having a polar group selected from the group consisting of $—SO_3M$, $—OSO_3M$, $—COOM$, $—PO(OM)$ and $—OPO(OM)_2$ wherein M represents a hydrogen atom or an alkali metal to prepare a first dispersion, (b) dispersing the chromium oxide in the second binder to prepare a second dispersion, (c) adding the second dispersion to the first dispersion for preparing a magnetic coating composition, and (d) coating the magnetic coating composition on the support.

DETAILED DESCRIPTION OF THE INVENTION

Figure 1:
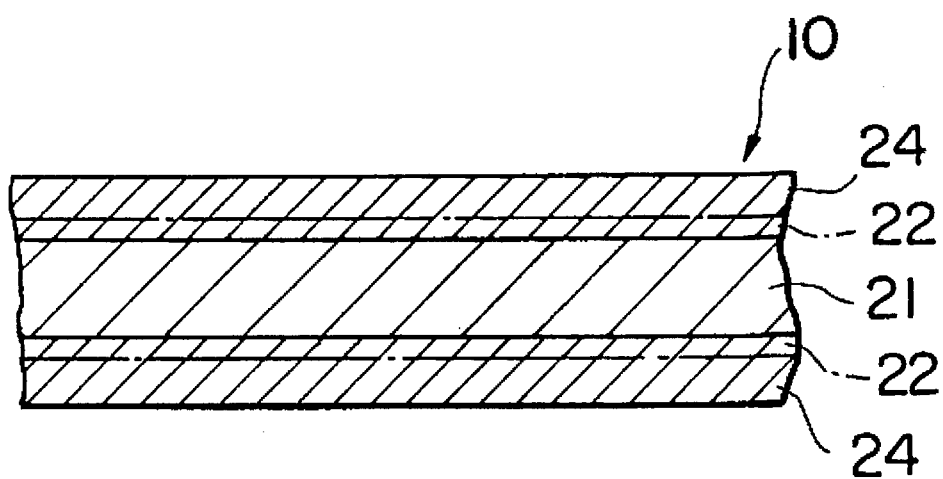
FIG. 1 is a partial cross section of an example of the disk type magnetic recording medium according to the present invention.

According to the disk type magnetic recording medium of the present invention, a metal magnetic powder of an Fe—Al type or the like (a ferromagnetic alloy powder) is preferably used as the magnetic powder of the magnetic layer. Such a ferromagnetic alloy powder includes an Fe—Al type, an Fe—Al—Ni type, an Fe—Al—Zn type, an Fe—Ai—Co type, an Fe—Ni—Al type, an Fe—Ni—Si—Al—Mn type, an Fe—Ni—Si—Al—Zn type, an Fe—Al—Si type, and an Fe—Al—Ca type. These have superior corrosion resistance and dispersibility. Because of the aluminum contained therein, these also have a high coercive force and have a relatively large hadness in themselves, so that they can contribute the improvements in electromagnetic conversion characteristics and travel durability.

In the above metal magnetic powder, a preferred ferromagnetic alloy powder has the structure that the ratio of contents of Fe atoms to Al atoms which are contained in the ferromagnetic alloy powder is Fe:Al=100:1 to 100:20 in atom number ratio, and the ratio of contents of Fe atoms to Al atoms according to ESCA analysis (electron spectroscopy for chemical analysis) of the ferromagnetic alloy powder in the surface area of not more than 100 Å in the depth is Fe:Al=30:70 to 70:30 in atom number ratio.

The ferromagnetic alloy powder used in the present invention may preferably have a specific surface area (BET value) of not less than 40 m$^2$/g. In particular, employment of a ferromagnetic alloy powder having a specific surface area (BET value) of not less than 42 m$^2$/g can bring about a remarkable improvement in electromagnetic conversion characteristics. The ferromagnetic alloy powder should also have a coercive force of usually not less than 1,000 Oe, and preferably not less than 1,200 Oe.

There are no particular limitations on the form of the magnetic powder usable in the present invention. For example, a needlelike, spherical or any other powder can be used.

The abrasive force, which is lowered as the particles of the ferromagnetic alloy powder as described above is made finer, can be effectively prevented from being lowered when chromium oxide ($Cr_2O_3$) particles with an average particle diameter of from 0.3 to 0.5 μm are added, so that the durability of a magnetic layer can be greatly improved.

Such chromium oxide particles have a superior abrasive force compared with alumina or the like, and hence can prevent dropouts of magnetic powders, head clogging, etc. For this purpose, they should have an average particle diameter of not less than 0.3 μm in view of durability, and also should have an average particle diameter of not more than 0.5 μm in view of prevention of head wear and in view of electromagnetic conversion characteristics. Such a range for the average particle diameter for the first time enables the disk type magnetic recording medium for a magnetic disk to endure much severer conditions under which it is used than the conditions under which a magnetic tape or the like is used.

This chromium oxide particles should more preferably have an average particle diameter of from 0.32 to 0.45 μm, and still more preferably from 0.35 to 0.40 μm.

As a method of measuring the above average particle diameter, a cross section of the magnetic layer may be observed with an electron microscope to measure the diameters of individual particles, and a value obtained by averaging the major axes of 50 particles of the chromium oxide particles is defined as the "average particle diameter".

This chromium oxide particles should preferably be added to the magnetic layer in an amount of not more than 20 parts by weight, and more preferably from 10 to 13 parts by weight, based on 100 parts by weight of the magnetic powder.

When the magnetic powder used in the present invention is the magnetic alloy powder previously described, it is difficult to sufficiently disperse it. The polyurethane resin previously described, however, can well prevent this problem, and hence can improve the dispersibility.

More specifically, the polyurethane resin used contains one or more negative functional groups (hydrophilic polar groups) selected from the above-described —$SO_3M$, —$OSO_3M$, —COOM, —$PO(OM)_2$ and —$OPO(OM)_2$, wherein M represents hydrogen or an alkali metal such as lithium, potassium or sodium. Such a polar group present in the molecule contributes an improvement in compatibility of the resin with the magnetic powder. This brings about an improvement in the dispersibility of the magnetic powder and also prevents the magnetic powder from its agglomeration to more improve the stability of a coating solution, and furthermore can bring about an improvement in the durability of the magnetic recording medium.

With regard to the synthesis of such a polyurethane resin, it is possible to use the reaction of a polyol with a polyisocyanate, which is a method commonly utilized. The polyol component that is commonly used includes polyester polyols obtained by reacting a polyol with a polybasic acid. Thus, the polyurethane having a polar group can be synthesized when a polyester polyol having the above polar group is utilized as a starting material.

The polyol that can be herein used includes polyester polyols synthesized by the reaction of organic dibasic acids such as phthalic acid, adipic acid, dimerized linolenic acid and maleic acid, with glycols such as ethylene glycol, propylene glycol, butylene glycol and diethylene glycol, polyhydric alcohols such as trimethylolpropane, hexane triol, glycerol, trimethylolethane and pentaerythritol, or any two or more polyols selected from these glycols and polyhydric alcohols; lactone type polyester polyols synthesized from lactams such as s-caprolactam, α-methyl-1-caprolactam, s-methyl-s-caprolactam and γ-butylolactam; and polyether polyols synthesized from ethylene oxide, propylene oxide or butylene oxide. These polyols are reacted with an isocyanate such as tolylene diisocyante (TDI), hexamethylene diisocyante (HMDI), methylene diisocyante, methaxylilene diisocyante, diphenylmethane-4,4'-diisocyante (MDI), 1,5-naphthalene diisocyante (NDI), tolidine diisocyante (TODI) or lidine isocyanate methyl ester (LDI), whereby the polyols can be urethanated to give polyester polyurethane or polyether polyurethane or can be carbonated with phosgene or diphenyl carbonate to give polycaronate polyurethane. In usual instances, these polyurethanes can be produced mainly by reacting a polyisocyante with a polyol. These may be in the form of a urethane resin or Urethane prepolymer containing a free isocyanate group and/or a hydroxyl group, or may be in the form of a polyurethane containing none of these reactive terminal groups (for example, in the form of a urethane elastomer).

Methods for the production of the polyurethanes, urethane polymers or urethane elastomers and methods for curing and cross-linking are known in the art, and therefore detailed descriptions thereof are omitted herein.

It is also possible to utilize a method comprising, for example, preparing a polyurethane resin into which a polyfunctional OH has been introduced, and reacting (dehydrochlorination reaction) this polyurethane resin with a compound containing a polar group and a chlorine atom as set out below, thereby introducing a polar group into the polyurethane resin. $ClCH_2CH_2SO_3M$, $ClCH_2CH_2OSO_3M$, $ClCH_2COOM$, $ClCH_2PO(OM)_2$.

wherein M represents a hydrogen atom, an alkali metal such as Na, K, and Li, a methyl group or an ethyl group.

The reaction conditions should be so set as for the polyurethane resin to have a weight average molecular weight in the range of from 1 to 150,000, and preferably from 2.0 to 60,000.

In the above polyurethane resin, the repeating unit having the polar group should be contained in an amount within the range of from 0.01 to 5 mol %, and preferably from 0.1 to 2.0 mol %.

With regard to the introduction of a polar group into the polyurethane, methods are described in Japanese Patent Publication No. 41565/1983 and Japanese Patent Publications Open to Public Inspection (hereinafter referred to as Japanese Patent O.P.I. Publication(s)) No. 92422/1982, No. 92423/1982, No. 8127/1984, No. 5423/1984, No. 5424/1984, No. 121923/1987, etc. These can be utilized also in the present invention.

The above polyurethane resin can improve the wear resistance of the magnetic layer and also can impart an appropriate flexibility thereto. Use of a polyvinyl chloride type resin in combination of this polyurethane resin can bring about a better dispersibility of the magnetic powder and also can improve the mechanical strength of the magnetic layer. In this instance, the polyvinyl chloride type resin and the polyurethane resin should be used in the range of from 80:20 to 20:80, and preferably from 70:30 to 40:60, in weight ratio.

The polyvinyl chloride type resin used in combination of the polyurethane resin has in its molecular structure a polar group consisting of $-SO_3M$, $-OSO_3M$, $-COOM$, $-PO(OM)_2$ and $-OPO(OM)_2$ wherein M represents a hydrogen atom or an alkali metal.

Usable polyvinyl chloride type resins can be synthesized, for example, by reaction of a copolymer containing a hydroxyl group as exemplified by a vinyl chloride/vinyl alcohol copolymer and a compound having a polar group and a chlorine atom as set out below. $ClCH_2CH_2SO_3M$, $ClCH_2CH_2OSO_3M$, $ClCH_2PO(OM')_2$, $ClCH_2COOM$.
wherein M represents a hydrogen atom, an alkali metal such as Na, K, and Li, a methyl group or an ethyl group.

To pick up $ClCH_2CH_2SO_3Na$ as an example among these, the reaction proceeds as follows:

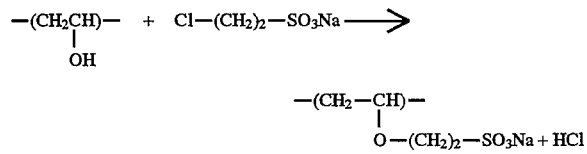

A method is also available in which copolymerization is carried out using monomers having the polar group. More specifically, a given amount of reactive monomers having an unsaturated bond into which the repeating unit containing a polar group is to be introduced is poured into a reaction vessel such as an autoclave, which may be then polymerized using a commonly available polymerization initiator as exemplified by polymerization initiators including a radical polymerization initiator such as BPO (benzoyl peroxide) or AIBN (azobisisobutylonitrile), a redox polymerization initiator, an anionic polymerization initiator and a cationic polymerization initiator. For example, the reactive monomers for introducing sulfonic acid or a salt thereof specifically include unsaturated hydrocarbon sulfonic acids such as vinylsulfonic acid, allylsulfonic acid, methacrylsulfonic acid and p-styrenesulfonic acid, and salts of these. They may further include sulfoalkyl esters of acrylic acid or methacrylic acid as exemplified by 2-acrylamido-2-methylpropanesulfonic acid, sulfoethyl acrylate or methacrylate and sulfopropyl acrylate or methacrylate, and salts of these, and also acrylic acid ethyl 2-sulfonate.

When carboxylic acid or a salt thereof is introduced (i.e., $-COOM$ is introduced), acrylic or methacrylic acid, maleic acid, etc. may be used. When phosphoric acid or a salt thereof is introduced, acrylic or methacrylic acid 2-phosphate may be used.

Into the vinyl Chloride copolymer, an epoxy group may preferably be introduced. Introduction of the epoxy group brings about an improvement of the thermal stability of the vinyl chloride copolymer. When the epoxy group is introduced, the repeating unit having an epoxy group may preferably be contained in the copolymer in the range of from 1 to 30 mol %, and more preferably from 1 to 20 mol %. As monomers for its introduction, it is preferred to use glycidyl acrylate.

With regard to the introduction of a polar group into the vinyl chloride copolymer, methods are described in Japanese Patent O.P.I. Publications No. 44227/1982, No. 108052/1983, No. 8127/1984, No. 101161/1985, No. 235814/1985, No. 238306/1985, No. 238371/1985, No. 121923/1987, No. 146432/1987, No. 146433/1987, etc. These can be utilized also in the present invention.

In the present invention, in addition to the above binders, unmodified vinyl chloride resins, polyurethane resins or polyester resins which are conventionally used can also be optionally used by mixture. It is also possible to use in combination, cellulose resins, phenoxy resins, or thermoplastic resins, thermosetting resins, reactive resins or electron-ray curable resins which have specific manners by which they are used.

In a preferred embodiment of the present invention, it is important to use the above modified polyurethane resin as a first binder, disperse the above magnetic alloy powder in a binder mainly composed of the first binder and also previously disperse the above chromium oxide particles in a second binder separately prepared, and add the resulting latter dispersion in the former dispersion comprising the magnetic powder.

More specifically, the magnetic alloy powder can be well dispersed because of the modified polyurethane resin described above, and on the other hand the chromium oxide particles that originally take a time for their dispersion are previously dispersed, so that the chromium oxide particles can be added in the state they have been already well dispersed in a binder. Hence, preparation of a magnetic coating composition can be well satisfactorily carried out in a short time.

The $Cr_2O_3$ particles used in the present invention can originally be dispersed with difficulty, and is different in time end conditions necessary for their dispersion, from the ferromagnetic alloy powder. In order to be sufficiently dispersed, the $Cr_2O_3$ particles take a dispersion time from about three times to about five times that for the ferromagnetic alloy powder. In conventional methods, however, in order to disperse it together with ferromagnetic alloy powder the dispersion is carried out under the dispersion time or conditions adapted to those for the ferromagnetic alloy powder. If the dispersion conditions are adapted to those for $Cr_2O_3$ particles, the ferromagnetic alloy powder may be poorly dispersed, and on the other hand if the dispersion time is adapted for $Cr_2O_3$ particles, crystals of the ferromagnetic alloy powder may be broken to bring about a serious lowering of electromagnetic conversion characteristics. Hence, in conventional cases, $Cr_2O_3$ particles are present in a magnetic coating composition in an insufficiently dispersed state. In such an instance, $Cr_2O_3$ particles protrude from the surface of a magnetic layer when they are agglomerated. This not only may damage the smoothness of the magnetic layer to lower electromagnetic conversion characteristics but also the agglomerates may fall off when they have struck against the head, to cause dropouts, even resulting in a lowering of the yield of magnetic disks. Now, in the present invention the $Cr_2O_3$ particles are previously well dispersed under appropriate conditions to give a separate dispersion, which is thereafter added in the dispersion comprising the ferromagnetic alloy powder (a coating solution composition for forming magnetic layers).

There are no particular limitations on the method for dispersion treatment. The order in which the various components such as a dispersion of $Cr_2O_3$ are added can be appropriately determined. In order to perfectly mix them, it is preferred to first add the dispersion of $Cr_2O_3$ and thereafter carry out further dispersion. Machinery used for the dispersion treatment includes, for example, a twin-roll mill, a three-roll mill, a ball mill, a sand grinder, a high-speed impeller, a high-speed stone mill, a dispersion kneader, a high-speed mixer, a ribbon blender, a co-kneader, an intensive mixer, a tumbling mixer, a blender, a disperser, a homogenizer and an ultrasonic dispersion machine. These may be appropriately selected so that they can be used for working the present invention.

The second binder, used for provisionally (or separately) dispersing chromium oxide particles, should preferably be a binder having a polar group which is the same polyurethane resin as the first binder. The number of the polar groups, however, may be less than that of the first binder. This second binder may also be comprised of an unmodified polyurethane resin or other resins previously described.

In addition to the above magnetic powder and binders, a lubricant may be added in the magnetic layer described above, which is as exemplified by silicone oil, graphite, molybdenum disulfide, tungsten disulfide, monobasic fatty acids; e.g., stearic acid, and fatty acid esters. As non-magnetic abrasive particles, it is also possible to use in combination a small amount of alumina such as $\alpha$-$Al_2O_3$ (corundum), artificial corundum, $\alpha$-$Fe_2O_3$ (hematite), artificial diamond, garnets, or emery (main components: corundum and magnetite). An antistatic agent such as carbon black may also be added in the above magnetic layer.

Solvents that can be used in the magnetic coating composition (and also a coating composition for a back coat layer as will be described later) include ketones as exemplified by methyl ethyl ketone, ethers as exemplified by dimethyl ether, esters as exemplified by ethyl acetate, aromatic solvents as exemplified by toluene, and alcohols as exemplified by methanol. These can be used alone or in the form of a mixture.

The disk type magnetic recording medium of the present invention comprises, for example, as denoted by the numeral 10 in FIG. 1, a non-magnetic support 21 and, provided on both sides thereof, magnetic layers 24 each optionally interposing an intermediate layer 22. An over coat layer (not shown) may further optionally be provided on the magnetic layer(s).

The magnetic layer 24 may preferably have a dry coating thickness of from 0.5 to 4.5 μm, and more preferably from 3.0 to 4.0 μm.

In the instance where an intermediate layer 22 is provided beneath a magnetic layer, a subbing layer may be formed by coating any of the various binders described above. This intermediate layer is provided as an adhesive layer or subbing layer for the purpose of improving the adhesion between the magnetic layer and the support or improving electrical conductivity.

Materials for the support 21 include polyesters such as polyethylene terephthalate and polyethylene-2,6-naphthalate, polyolefins such as polypropylene, cellulose derivatives such as cellulose triacetate and cellulose diacetate, and plastics such as polycarbonate. It is also possible to use non-magnetic metals such as Cu, Al and Zn, glass, and what is called a new ceramic.

The support formed using any of these materials may have a thickness usually in the range of from 10 to 80 μm.

At least one surface of the support is provided with a magnetic layer. In usual instances, the other surface is also provided with a magnetic layer. A magnetic disk can be effectively prevented from its deformation (curling) when both sides of the support are provided with a magnetic layer in this way. It is also possible to prevent curling by providing a back coat layer on its back surface.

The present invention may also be applied, for example, in magnetic disks such as video floppy disks for electronic still cameras, and data floppy disks.

EXAMPLES

Examples of the present invention will be described below.

The components, proportions, order of operation, etc. as set out below can be varied so long as they are not deviated from what is intended by the present invention.

Example 1

The components as shown below were thoroughly kneaded and dispersed using a dispersion kneader and a ball mill. Next, immediately before coating, 5 parts by weight of a polyisocyanate compound (Colonate L, available from Nippon Polyurethane Industry Co., Ltd.) was added and mixed to prepare a magnetic coating composition (I).

| Magnetic coating composition (I) | |
|---|---|
| Ferromagnetic alloy powder (Fe—Ni type) (specific surface area: 47 m$^2$/g, coercive force (Hc): 1,250 Oe) | 100 parts by weight |
| Polyurethane (UR8300, available from Toyobo Co., Ltd.; containing a —SO$_3$Na group) | 6 parts by weight |
| Vinyl chloride copolymer MR110, available from Nippon Zeon Co., Ltd.; containing a —SO$_3$K group) | 10 parts by weight |
| Chromium oxide (Cr$_2$O$_3$) (average particle diameter: 0.38 μm) | 10 parts by weight |
| Carbon black (average particle diameter: 55 nm; BET specific surface area: 32 m$^2$/g; DBP oil absorption: 180 ml/100 g) | 0.5 part by weight |
| Oleic acid | 1 part by weight |
| Butyl stearate | 1 part by weight |
| Cyclohexanone | 100 parts by weight |
| Methyl ethyl ketone | 100 parts by weight |
| Toluene | 100 parts by weight |

The resulting magnetic coating composition was filtered to remove poorly dispersed components, and then coated on both surfaces of a polyethylene terephthalate film (thickness: 32 μm) using a reverse roll coater to give a dry coating thickness of 3.5 μm for each. After removal of solvents with heating, the coatings were calendered, and subsequently subjected to heat curing for the polyisocyanate compound.

After the heat curing, the resulting medium was punched into a disk of 2 inches in diameter, and then sealed in a cassette. An electronic still-video floppy disk was thus produced.

Example 2

An electronic still-video floppy disk was produced in the same manner as in Example 1 except that the polyurethane containing an —SO$_3$Na group was replaced with a polyurethane containing a —COOH group (TIM-6001, available from Sanyo Chemical Industries, Ltd.).

Example 3

An electronic still-video floppy disk was produced in the same manner as in Example 1 except that the Cr$_2$O$_3$ having an average particle diameter of 0.38 μm was replaced with $Cr_2O_3$ having an average particle diameter of 0.30 μm.

Example 4

An electronic still-video floppy disk was produced in the same manner as in Example 1 except that the $Cr_2O_3$ having an average particle diameter of 0.38 μm was replaced with $Cr_2O_3$ having an average particle diameter of 0.50 μm.

Example 5

An electronic still-video floppy disk was produced in the same manner as in Example 1 except that the polyurethane containing an —$SO_3Na$ group was replaced with a polyurethane containing an —$SO_3K$ group.

Example 6

An electronic still-video floppy disk was produced in the same manner as in Example 1 except that the polyurethane containing an —$SO_3Na$ group was replaced with a polyurethane containing an —$OSO_3Na$ group.

Example 7

An electronic still-video floppy disk was produced in the same manner as in Example 1 except that the polyurethane containing an —$SO_3Na$ group was replaced with a polyurethane containing a —$PO(ONa)_2$ group.

Example 8

An electronic still-video floppy disk was produced in the same manner as in Example 1 except that the polyurethane containing an —$SO_3Na$ group was replaced with a polyurethane containing a —$OPO(ONa)_2$ group.

Comparative Example 1

An electronic still-video floppy disk was produced in the same manner as in Example 1 except that the polyurethane containing an —$SO_3Na$ group was replaced with N2301 (available from Nippon Polyurethane Industry Co., Ltd.).

Comparative Example 2

An electronic still-video floppy disk was produced in the same manner as in Example 1 except that the $Cr_2O_3$ having an average particle diameter of 0.38 μm was replaced with $Cr_2O_3$ having an average particle diameter of 0.25 μm.

Comparative Example 3

An electronic still-video floppy disk was produced in the same manner as in Example 1 except that the $Cr_2O_3$ having an average particle diameter of 0.38 μm was replaced with $Cr_2O_3$ having an average particle diameter of 0.55 μm.

Comparative Example 4

An electronic still-video floppy disk was produced in the same manner as in Example 1 except that the $Cr_2O_3$ having an average particle diameter of 0.38 μm was replaced with $Al_2O_3$ having an average particle diameter of 0.38 μm.

Using the above respective video floppy disks, evaluation was made on the following performances. Results obtained are shown in Table 2.

Travel Durability (Seek Durability)

Using a commercially available electronic still-video floppy disk recorder (AG800, manufactured by Matsushita Electric Industrial Co., Ltd.), reproduction for 4 seconds on each track was continuously repeated through 1st to 50th tracks in a still mode of the electronic still-video floppy disk on all 50 tracks of which picture signals had been recorded, to measure the time by which the reproduction output was lowered by 3 dB from its initial value or by which a lowering of picture quality such as dropouts occurred on a reproduced picture. Results obtained are shown in Table 2. In the table, "300 hrs or more" indicates that the reproduction output did not lower by 3 dB and also no lowering of picture quality occurred, even after reproduction carried out for 300 hours.

RF Output

Using MVR-5500, manufactured by Sony Corp., sinusoidal signals of 7 MHz were recorded, and reproduction RF output was measured. The measured reproduction RF output is shown in Table 2 as a relative value to the value of a gold reference. The greater the RF output value is, the better the electronic still-video floppy disk is.

Head Wear

Using a still video player KR-400, manufactured by Konica Corporation, head wear was measured under the following conditions.

Temperature and humidity: Normal temperature and normal humidity.

Disks are exchanged at intervals of 100 hours.

Still-mode reproduction is carried out for 3 minutes each from 1st track. When it is finished up to 50th track, it is returned to 1st track. This operation is regarded as 1 pass, and is repeated 40 passes to have taken 100 hours. This is carried out for 1,000 hours, and then the depth of wear was measured. Evaluation is made according to what is shown in Table 1 below.

TABLE 1

| Depth of wear of head (μm) | Evaluation |
| --- | --- |
| 2 μm or less | A |
| 2 μm to less than 3 μm | B |
| 3 μm or more | C |

TABLE 2

| | Seek durability | Head wear | RF output (dB) |
| --- | --- | --- | --- |
| Example: | | | |
| 1 | 300 hrs or more | A | 2.0 |
| 2 | 300 hrs or more | A | 2.1 |
| 3 | 300 hrs or more | A | 2.0 |
| 4 | 300 hrs or more | A | 2.2 |
| 5 | 300 hrs or more | A | 2.0 |
| 6 | 300 hrs or more | A | 2.0 |
| 7 | 300 hrs or more | A | 2.0 |
| 8 | 300 hrs or more | A | 2.0 |
| Comparative Example: | | | |
| 1 | 18 hrs | —[1] | 0.5 |
| 2 | 153 hrs | A | 2.0 |
| 3 | 300 hrs or more | C | 1.0 |
| 4 | 100 hrs | A | 1.0 |

[1]Unmeasurable because of a disk durability of 100 hours or less.

These results show that magnetic disks having achieved an improved durability, a decrease in head clogging and a decrease in D/O, and also having high electromagnetic conversion characteristics can be provided when the disk type magnetic recording mediums are constituted according to the present invention.

Example 9

An electronic still-video floppy disk was produced in the same manner as in Example 1 except that the ferromagnetic alloy powder (Fe-Ni type) was replaced with an iron-aluminum ferromagnetic alloy powder (aluminum content: 4% by weight; specific surface area: 47 m²/g; coercive force (Hc): 1,250 Oe).

Example 10

An electronic still-video floppy disk was produced in the same manner as in Example 9 except that the polyurethane containing an —SO₃Na group was replaced with a polyurethane containing a —COOH group (TIM-6001, available from Sanyo Chemical Industries, Ltd.).

Example 11

An electronic still-video floppy disk was produced in the same manner as in Example 9 except that the Cr₂O₃ having an average particle diameter of 0.38 µm was replaced with Cr₂O₃ having an average particle diameter of 0.30 µm.

Example 12

An electronic still-video floppy disk was produced in the same manner as in Example 9 except that the Cr₂O₃ having an average particle diameter of 0.38 µm was replaced with Cr₂O₃ having an average particle diameter of 0.50 µm.

Example 13

An electronic still-video floppy disk was produced in the same manner as in Example 9 except that the polyurethane containing an —SO₃Na group was replaced with a polyurethane containing an —SO₃K group.

Example 14

An electronic still-video floppy disk was produced in the same manner as in Example 9 except that the polyurethane containing an —SO₃Na group was replaced with a polyurethane containing an —OSO₃Na group.

Example 15

An electronic still-video floppy disk was produced in the same manner as in Example 9 except that the polyurethane containing an —SO₃Na group was replaced with a polyurethane containing a —PO(ONa)₂ group.

Example 16

An electronic still-video floppy disk was produced in the same manner as in Example 9 except that the polyurethane containing an —SO₃Na group was replaced with a polyurethane containing a —OPO(ONa)₂ group.

Comparative Example 5

An electronic still-video floppy disk was produced in the same manner as in Example 9 except that the polyurethane containing an —SO₃Na group was replaced with N2301 (available from Nippon Polyurethane Industry Co., Ltd.).

Comparative Example 6

An electronic still-video floppy disk was produced in the same manner as in Example 9 except that the Cr₂O₃ having an average particle diameter of 0.38 µm was replaced with Cr₂O₃ having an average particle diameter of 0.25 µm.

Comparative Example 7

An electronic still-video floppy disk was produced in the same manner as in Example 9 except that the Cr₂O₃ having an average particle diameter of 0.38 µm was replaced with Cr₂O₃ having an average particle diameter of 0.55 µm.

Comparative Example 8

An electronic still-video floppy disk was produced in the same manner as in Example 9 except that the Cr₂O₃ having an average particle diameter of 0.38 µm was replaced with Al₂O₃ having an average particle diameter of 0.38 µm.

Using the above respective video floppy disks, evaluation was made in the same manner as previously described. Results obtained are shown in Table 3.

TABLE 3

|  | Seek durability | Head wear | RF output (dB) |
|---|---|---|---|
| Example: |  |  |  |
| 9 | 500 hrs or more | A | +2.2 |
| 10 | 500 hrs or more | A | +2.3 |
| 11 | 500 hrs or more | A | +2.2 |
| 12 | 500 hrs or more | A | +2.4 |
| 13 | 500 hrs or more | A | +2.2 |
| 14 | 500 hrs or more | A | +2.2 |
| 15 | 500 hrs or more | A | +2.2 |
| 16 | 500 hrs or more | A | +2.2 |
| Comparative Example: |  |  |  |
| 5 | 54 hrs or more | —*1) | +0.6 |
| 6 | 138 hrs | A | +2.2 |
| 7 | 500 hrs or more | C | +1.2 |
| 8 | 108 hrs | A | +1.2 |

*1)Unmeasurable because of a disk durability of 100 hours or less.

These results show that magnetic disks having achieved an improved durability, a decrease in head clogging and a decrease in D/O, and also having high electromagnetic conversion characteristics can be provided when the disk type magnetic recording mediums are constituted according to the present invention.

Example 17

The coating composition (I) as shown below was thoroughly kneaded and dispersed using a dispersion kneader and a ball mill to prepare a coating composition (II).

| Coating composition (I) | |
|---|---|
| Chromium oxide (Cr₂O₃) (average particle diameter: 0.4 µm) | 10 parts by weight |
| Polyurethane (UR8300, available from Toyobo Co., Ltd.; containing an —SO₃Na group) | 2 parts by weight |
| Cyclohexanone | 6 parts by weight |
| Methyl ethyl ketone | 3 parts by weight |
| Toluene | 3 parts by weight |

Separately, a magnetic coating composition (II) as shown below were thoroughly kneaded and dispersed using a dispersion kneader and a ball mill. In the course of the dispersion, the coating composition (I) obtained in the way described above was added, and dispersion treatment was further continued until a dispersion homogeneous as a whole was prepared. Subsequently, 5 parts by weight of a polyisocyanate compound (Colonate L, available from Nippon Polyurethane Industry Co., Ltd.) was added and mixed to prepare a magnetic coating composition.

| Magnetic coating composition (II) | |
|---|---|
| Iron-aluminum ferromagnetic alloy powder (aluminum content: 4% by weight, specific surface area: 47 m²/g, coercive force (Hc): 1,250 Oe) | 100 parts by weight |
| Polyurethane (UR8300, available from Toyobo Co., Ltd.; containing an —SO$_3$Na group) | 6 parts by weight |
| Vinyl chloride copolymer (MR110, available from Nippon Zeon Co., Ltd.; containing an —SO$_3$K group) | 10 parts by weight |
| Carbon black (average particle diameter: 55 nm; BET specific surface area: 32 m²/g; DBP oil absorption: 180 ml/100 g) | 0.5 part by weight |
| Oleic acid | 1 part by weight |
| Butyl stearate | 1 part by weight |
| Cyclohexanone | 100 parts by weight |
| Methyl ethyl ketone | 100 parts by weight |
| Toluene | 100 parts by weight |

The resulting magnetic coating composition was filtered to remove poorly dispersed components, and then coated on both surfaces of a polyethylene terephthalate film (thickness: 32 μm) using a reverse roll coater to give a dry coating thickness of 3.5 μm for each. After removal of solvents with heating, the coatings were calendered, and subsequently subjected to heat curing for the polyisocyanate compound.

After the heat curing, the resulting medium was punched into a disk of 2 inches in diameter, and then sealed in a cassette. An electronic still-video floppy disk was thus produced.

Example 18

An electronic still-video floppy disk was produced in the same manner as in Example 17 except that in the coating composition (II) the polyurethane containing an —SO$_3$Na group was replaced with a polyurethane containing a —COOH group (TIM-6001, available from Sanyo Chemical Industries, Ltd.).

Example 19

An electronic still-video floppy disk was produced in the same manner as in Example 17 except that in the coating composition (I) the polyurethane UR8200 was replaced with a polyurethane having an —SO$_3$Na group (UR8300, available from Toyobo Co., Ltd.).

Example 20

An electronic still-video floppy disk was produced in the same manner as in Example 17 except that in the coating composition (I) the Cr$_2$O$_3$ having an average particle diameter of 0.40 μm was replaced with Cr$_2$O$_3$ having an average particle diameter of 0.30 μm.

Example 21

An electronic still-video floppy disk was produced in the same manner as in Example 17 except that in the coating composition (I) the Cr$_2$O$_3$ having an average particle diameter of 0.40 μm was replaced with Cr$_2$O$_3$ having an average particle diameter of 0.50 μm.

Example 22

An electronic still-video floppy disk was produced in the same manner as in Example 17 except that in the coating composition (I) the polyurethane containing an —SO$_3$Na group was replaced with a polyurethane containing no —SO$_3$Na group.

Example 23

An electronic still-video floppy disk was produced in the same manner as in Example 17 except that the polyurethane containing an —SO$_3$Na group was replaced with a polyurethane containing an —SO$_3$K group.

Example 24

An electronic still-video floppy disk was produced in the same manner as in Example 17 except that in the magnetic coating composition (II) the;polyurethane containing an —SO$_3$Na group was replaced with a polyurethane containing an —OSO$_3$Na group.

Example 25

An electronic still-video floppy disk was produced in the same manner as in Example 17 except that in the magnetic coating composition (II) the polyurethane containing an —SO$_3$Na group was replaced with a polyurethane containing a —PO(ONa)$_2$ group.

Example 26

An electronic still-video floppy disk was produced in the same manner as in Example 17 except that in the magnetic coating composition (II) the polyurethane containing an —SO$_3$Na group was replaced with a polyurethane containing a —OPO(ONa)$_2$ group.

Comparative Example 9

An electronic still-video floppy disk was produced in the same manner as in Example 17 except that in the magnetic coating composition (II) the polyurethane containing an —SO$_3$Na group was replaced with N2301 (available from Nippon Polyurethane Industry Co., Ltd.).

Comparative Example 10

An electronic still-video floppy disk was produced in the same manner as in Example 17 except that in the coating composition (I) the Cr$_2$O$_3$ having an average particle diameter of 0.40 μm was replaced with Cr$_2$O$_3$ having an average particle diameter of 0.25 μm.

Comparative Example 11

An electronic still-video floppy disk was produced in the same manner as in Example 17 except that in the coating composition (I) the Cr$_2$O$_3$ having an average particle diameter of 0.40 μm was replaced with Cr$_2$O$_3$ having an average particle diameter of 0.55 μm.

Comparative Example 12

An electronic still-video floppy disk was produced in the same manner as in Example 17 except that the Cr$_2$O$_3$ having an average particle diameter of 0.40 μm was replaced with Al$_2$O$_3$ having an average particle diameter of 0.38 μm.

Using the above respective video floppy disks, evaluation was made in the same manner is previously described. Results obtained are shown in Table 4.

In the table, the yield is based on the following.

Using a dropout measuring apparatus manufactured by Konica Corporation, an electronic still-video floppy disk having three or more dropouts of 14 μsec or more in length and −12 dB or more in depth in a sheet is regarded as an NG (no-good) article (or a defective). Then, the acceptance rate (%) obtained when 100 sheets were measured is shown as the yield.

TABLE 4

|  | Seek durability | Head wear | Yield | RF output (dB) |
|---|---|---|---|---|
| Example |  |  |  |  |
| 17 | 500 hrs or more | A | 93% | +3.4 |
| 18 | 500 hrs or more | A | 91% | +3.3 |
| 19 | 500 hrs or more | A | 91% | +3.1 |
| 20 | 500 hrs or more | A | 92% | +3.4 |
| 21 | 500 hrs or more | A | 92% | +3.2 |
| 22 | 500 hrs or more | A | 90% | +3.0 |
| 23 | 500 hrs or more | A | 89% | +3.0 |
| 24 | 500 hrs or more | A | 89% | +3.1 |
| 25 | 500 hrs or more | A | 90% | +3.0 |
| 26 | 500 hrs or more | A | 90% | +3.0 |
| Comparative Example: |  |  |  |  |
| 9 | 54 hrs | —*1) | 83% | +1.4 |
| 10 | 138 hrs | A | 91% | +3.4 |
| 11 | 500 hrs or more | C | 92% | +3.0 |
| 12 | 108 hrs | A | 91% | +2.0 |

*1)Unmeasurable because of a disk durability of 100 hours or less.

These results show that magnetic disks having achieved an improved durability, a decrease in head clogging and a decrease in D/O, and also having high electromagnetic conversion characteristics can be provided when the disk type magnetic recording mediums are constituted according to the present invention.

What is claimed is:

1. A magnetic recording medium comprising a non-magnetic support having provided thereon, a magnetic layer containing a first binder, chromium oxide having an average particle size of 0.3 to 0.5 microns, and a metal magnetic powder comprising iron and aluminum, wherein said first binder comprises:

(1) a polyurethane resin having a polar group selected from the group consisting of $SO_3M$, $OSO_3M$, $COOM$, $PO(OM)_2$, and $OPO(OM)_2$, wherein M represents hydrogen or an alkali metal; and (2) a polyvinyl chloride resin having an epoxy group and a polar group selected from the group consisting of $SO_3M$, $OSO_3M$, $COOM$, $PO(OM)_2$, and $OPO(OM)_2$, wherein M represents hydrogen or an alkali metal.

2. The medium of claim 1, wherein the chromium oxide content of the magnetic layer is not more than 20 parts by weight per 100 parts by weight of said metal magnetic powder.

3. The medium of claim 1, wherein the chromium oxide content of the magnetic layer is 10 to 13 parts by weight per 100 parts by weight of the metal magnetic powder.

4. The medium of claim 1, wherein the magnetic layer further contains a second binder and the chromium oxide having an average particle size within the range of 0.3 to 0.5 μm is dispersed in the second binder.

5. The medium of claim 4, wherein the second binder is a polyurethane resin having a polar group selected from the group consisting of —$SO_3M$, —$OSO_3M$, —$COOM$, —$PO(OM)_2$, and —$OPO(OM)_2$ wherein M represents a hydrogen atom or an alkali metal.

6. The medium of claim 1, wherein the magnetic powder has a specific surface area having BET value of not less than 40 $m^2/g$.

7. The medium of claim 1, wherein a repeating unit having the polar group is contained in an amount within the range of 0.01 to 5 mol % in the polyurethane resin.

8. The medium of claim 1, wherein a weight ratio of the polyvinyl chloride resin to the polyurethane resin is within the range of 80 to 20 through 20 to 80.

9. A process for manufacturing a magnetic recording medium comprising a support, a magnetic layer on said support and containing a first binder, a second binder, chromium oxide having an average particle size of 0.3 to 0.5 microns, and a metal magnetic powder, said process comprising;

(a) forming a first dispersion by dispersing said metal magnetic powder in said first binder, said first binder comprising;

(1) a polyurethane resin having a polar group selected from the group consisting of $SO_3M$, $OSO_3M$, $COOM$, $PO(OM)_2$, and $OPO(OM)_2$, wherein M is hydrogen or an alkali metal, and (2) a polyvinyl chloride resin having an epoxy group and a polar group selected from the group consisting of $SO_3M$, $OSO_3M$, $COOM$, $PO(OM)_2$, and $OPO(OM)_2$, wherein M represents hydrogen or an alkali metal;

(b) dispersing said chromium oxide in said second binder to prepare a second dispersion;

(c) adding said second dispersion to said first dispersion to form a magnetic coating composition; and (d) coating said magnetic coating composition on said support.

10. The process of claim 9, wherein the metal magnetic powder comprises iron and aluminum.

* * * * *